United States Patent
Ko et al.

(10) Patent No.: US 9,331,891 B2
(45) Date of Patent: May 3, 2016

(54) VIRTUAL CONSOLIDATED APPLIANCE

(71) Applicant: International Business Machines Corporation, Armonk, NY (US)

(72) Inventors: Bong Jun Ko, Harrington Park, NJ (US); Kang-Won Lee, Nanuet, NY (US); Erich M. Nahum, New York, NY (US); Maroun Touma, Redding, CT (US); Dinesh C. Verma, New Castle, NY (US); Ho Yin Starsky Wong, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 13/649,534

(22) Filed: Oct. 11, 2012

(65) Prior Publication Data

US 2014/0108638 A1   Apr. 17, 2014

(51) Int. Cl.
  *G06F 15/173* (2006.01)
  *H04L 29/08* (2006.01)
  (Continued)

(52) U.S. Cl.
  CPC ...... *H04L 29/08189* (2013.01); *H04L 41/0813* (2013.01); *H04L 41/0896* (2013.01); *H04L 43/04* (2013.01); *H04L 43/0811* (2013.01); *H04L 67/1031* (2013.01)

(58) Field of Classification Search
  CPC ..... H04L 41/0813; H04L 12/24; H04L 29/26; H04L 29/08189; H04L 41/0896; H04L 43/0811
  USPC .......................................... 709/224, 221, 226
  See application file for complete search history.

(56) References Cited

U.S. PATENT DOCUMENTS 7,480,720 B2 *  1/2009  Chu et al. ....................... 709/226
7,769,025 B2 *  8/2010  Bowen et al. ............. 370/395.32
(Continued)

FOREIGN PATENT DOCUMENTS

EP         2241976 A2   10/2010
JP       2009181249 A    8/2009
(Continued)

OTHER PUBLICATIONS

J Hu, J Gu, G Sun, T Zhao—A Scheduling Strategy on Load Balancing of virtual Machine Resources in Cloud Computing Environment, Dec. 18-20, 2010, IEEE, 3rd International Sympoisum on Parallell Architectures, Algorithms and Programming, pp. 89-96.*
(Continued)

*Primary Examiner* — June Sison
*Assistant Examiner* — Dixon Dabipi
(74) *Attorney, Agent, or Firm* — Jennifer R. Davis; Michael J. Chang, LLC

(57) ABSTRACT

Techniques for managing network traffic in a virtual consolidated appliance so as to avoid interruptions in existing network connections during reconfiguration of the virtual consolidated appliance are provided. In one aspect, a method for operating a virtual consolidated appliance having a plurality of servers is provided. The method includes the following steps. An assignment for load balancing is computed based on a status of the virtual consolidated appliance. A reconfiguration of the virtual consolidated appliance is discovered. A new assignment is computed for load balancing based on a new status of the virtual consolidated appliance based on the reconfiguration of the virtual consolidated appliance. Existing network connections are redirected according to the assignment during the reconfiguration of the virtual consolidated appliance. New network connections are served according to the new assignment.

12 Claims, 6 Drawing Sheets

(51) Int. Cl.
*H04L 12/24* (2006.01)
*H04L 12/26* (2006.01)

(56) References Cited

U.S. PATENT DOCUMENTS

| | | |
|---|---|---|
| 2003/0187915 A1 | 10/2003 | Sun et al. |
| 2010/0131636 A1 | 5/2010 | Suri et al. |
| 2010/0138475 A1* | 6/2010 | Frank et al. .................. 709/203 |
| 2010/0262974 A1 | 10/2010 | Uyeda |
| 2011/0202927 A1 | 8/2011 | Miloushev et al. |
| 2012/0266234 A1* | 10/2012 | Ocko et al. ..................... 726/17 |

FOREIGN PATENT DOCUMENTS

| | | |
|---|---|---|
| JP | 2010033292 A | 2/2010 |
| JP | 2011108014 A | 6/2011 |

OTHER PUBLICATIONS

Xiaoqiao Meng ; T.J. Watson Res. Center, IBM, Hawthorne, NY, USA ; Vasileios Pappas ; Li Zhang, Improving the Scalability of Data Center Networks with Traffic-aware Virtual Machine Placement , Mar. 14-19, 2010, IEEE, INFOCOM, 2010 Proceedings IEEE, pp. 1-9.*
Xiaoying Wang, "Appliance-Based Autonomic Provisioning Framework for Virtualized Outsourcing Data Center," ICAC '07. Fourth International Conference on Autonomic Computing, vol., No., pp. 29, Jun. 11-15, 2007.
Jonathan Appavoo et al., "Project Kittyhawk: Building a Global-Scale Computer" ACM SIGOPS Operating Systems Review vol. 42 Issue 1, January New York, NY, USA 2008.
Otsuki , English Abstract of JP2011108014A published Jun. 2, 2011.
Fujita, English Abstract of JP2009181249 published Aug. 13, 2009.
Ota, English Abstract of JP2010033292 published Feb. 12, 2010.

* cited by examiner

MAIN SOFTWARE COMPONENTS

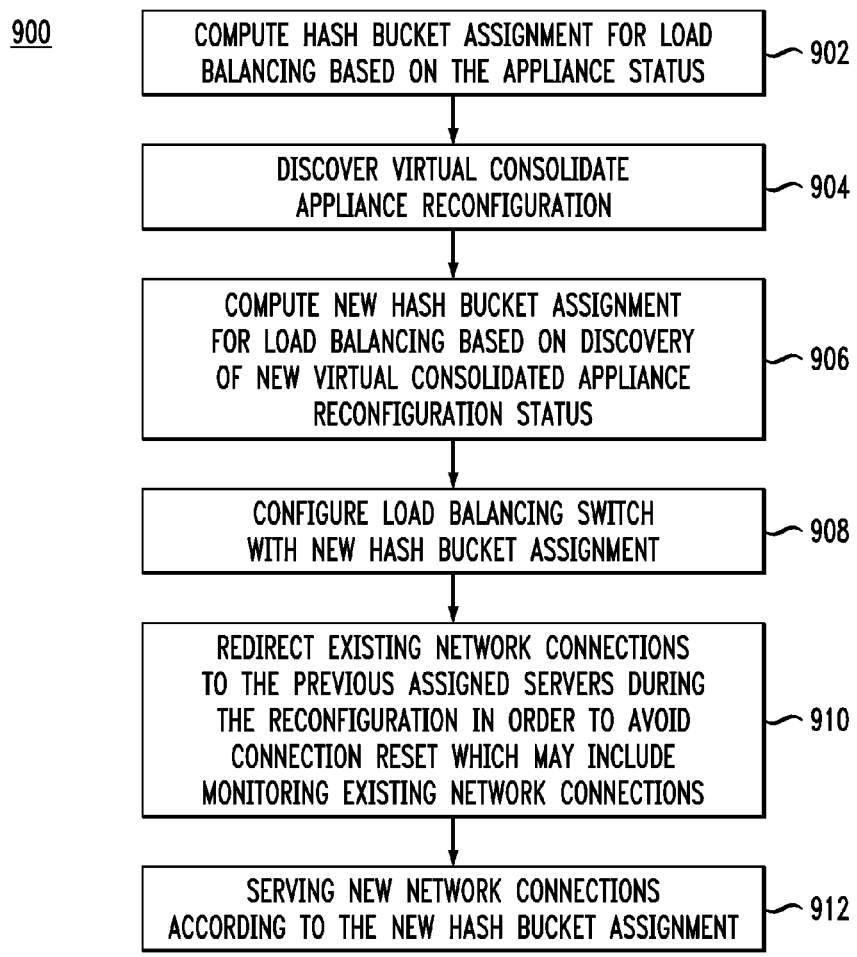
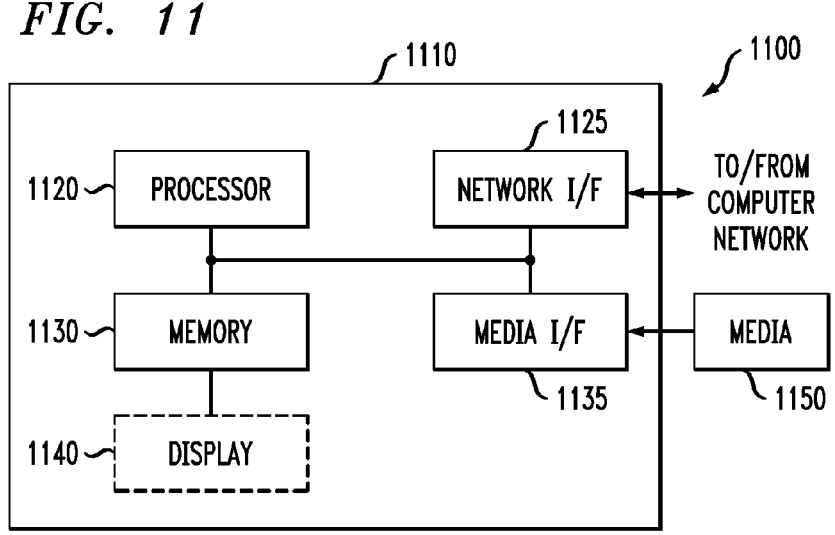

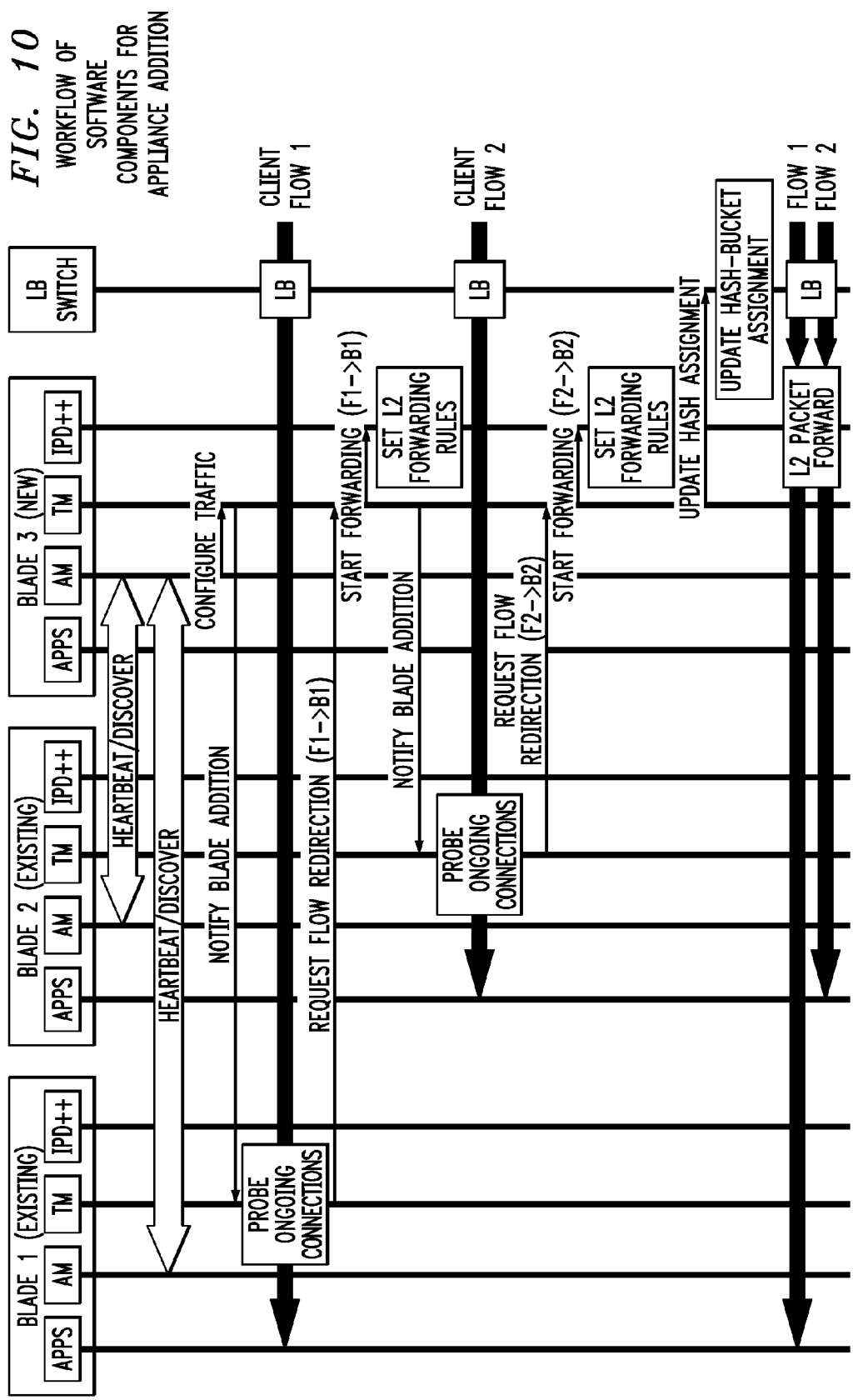

VIRTUAL CONSOLIDATED APPLIANCE

FIELD OF THE INVENTION

The present invention relates to virtual consolidated appliances and more particularly, to techniques for managing network traffic in a virtual consolidated appliance so as to avoid interruptions in existing network connections during reconfiguration of the virtual consolidated appliance.

BACKGROUND OF THE INVENTION

A virtual consolidated appliance is a cluster of appliances that work as a single virtual appliance. An appliance can be a server, blade, a rack-mounted server, etc. To distribute workload into the virtual appliance, a current solution is to have a load balancing switch in front of the cluster of appliances to distribute load across them. However, with an L2-L3 load balancing switch, when the administrator tries to add an additional appliance(s) (e.g., to increase processing capacity, or shut down for maintenance, etc.), existing network connections (TCP/UDP/IP) may reset due to the change in the load distribution to the appliances. A similar problem occurs when trying to remove appliances or disable appliances (e.g., for maintenance, power saving, etc.).

A load balancing switch with L4-L7 context can potentially prevent this problem, but adds complexity to the switching logic. Hence, switching speed might suffer. Also this load balancing switch does not work well with redundant switch configuration—active and hot swap—since the context in active switch may not be present when it is replaced by a stand-by.

Thus, techniques which permit existing connections to still be served when a reconfiguration of the virtual consolidated appliance occurs would be desirable.

SUMMARY OF THE INVENTION

The present invention relates to techniques for managing network traffic in a virtual consolidated appliance so as to avoid interruptions in existing network connections during reconfiguration of the virtual consolidated appliance. In one aspect of the invention, a method for operating a virtual consolidated appliance having a plurality of servers is provided. The method includes the following steps. An assignment for load balancing is computed based on a status of the virtual consolidated appliance. A reconfiguration of the virtual consolidated appliance is discovered. A new assignment is computed for load balancing based on a new status of the virtual consolidated appliance based on the reconfiguration of the virtual consolidated appliance. Existing network connections are redirected according to the assignment during the reconfiguration of the virtual consolidated appliance. New network connections are served according to the new assignment.

In another aspect of the invention, a virtual consolidated appliance is provided. The virtual consolidated appliance includes a plurality of servers, each of the servers comprising i) a first module configured to compute an assignment for load balancing based on a status of the virtual consolidated appliance, ii) a second module configured to discover a reconfiguration of the virtual consolidated appliance, and whereby the first module is configured to compute a new assignment for load balancing based on a new status of the virtual consolidated appliance based on the reconfiguration of the virtual consolidated appliance, and iii) a third module configured to redirect existing network connections according to the assignment during the reconfiguration of the virtual consolidated appliance; and a load balancing switch for directing network connections to the servers configured to serve new network connections according to the new assignment.

A more complete understanding of the present invention, as well as further features and advantages of the present invention, will be obtained by reference to the following detailed description and drawings.

BRIEF DESCRIPTION OF THE DRAWINGS

FIG. 9 is a diagram illustrating exemplary methodology for operating a virtual consolidated appliance, such as the virtual consolidated appliance shown in FIG. 8 according to an embodiment of the present invention;

FIG. 10 is a diagram illustrating a timeline of the present techniques in the context of a scaling-up scenario according to an embodiment of the present invention; and FIG. 11 is a diagram illustrating an exemplary apparatus for performing one or more of the methodologies presented herein according to an embodiment of the present invention.

DETAILED DESCRIPTION OF PREFERRED EMBODIMENTS

Figure 1:
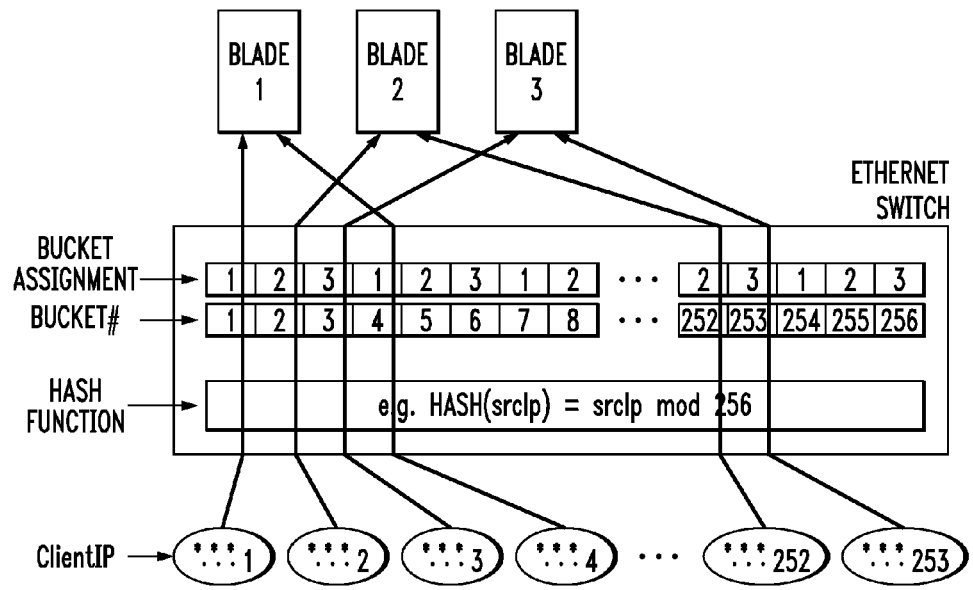
FIG. 1 is a schematic diagram illustrating an exemplary load balancing scheme involving multiple servers operating as a virtual consolidated appliance according to an embodiment of the present invention.

As provided above, with a virtual consolidated appliance when an administrator needs to power down one machine and/or add a new machine to the cluster, this creates a hot swap. The problem with conventional set-ups is that any ongoing sessions will be impacted. Advantageously, the present techniques provide a mechanism to avoid impacting ongoing sessions and maintain existing connections during the hot swap.

The present techniques are generally applicable to any cluster of machines (e.g., a cluster of servers, blades, appliances, etc.) operating as a virtual consolidated appliance. Running a cluster of machines, such as multiple servers, can be used to increase capacity and will appear to users as a single, e.g., server, with large capacity.

Load balancers may be employed to depress the workload to the multiple machines so that the workload is balanced between the machines. Using the example of multiple servers being operated as a cluster, when a client tries to access the servers, one possible load balancing scheme is to splay the workload based on client IP addresses. For instance, client IP addresses ending in a .1 are assigned to a $1^{st}$ bucket, client IP addresses ending in a .2 are assigned to a $2^{nd}$ bucket, etc. The buckets are then assigned to a particular port in a round-robin manner. For example, the $1^{st}$ bucket is assigned to port 1, the $2^{nd}$ bucket is assigned to port 2, the $3^{rd}$ bucket is assigned to port 3, the $4^{th}$ bucket is assigned to port 1, the $5^{th}$ bucket is assigned to port 2, and so on. The ports correspond to the servers. Thus, in this example, three servers (server 1, server 2 and server 3) are present in the cluster and the ports 1, 2, and 3 correspond to server 1, server 2 and server 3, respectively.

See, for example, FIG. 1 which illustrates this exemplary load balancing scheme. Namely, as shown in FIG. 1, multiple clients are accessing a cluster of servers. In this example, three servers (labeled "Blade 1," "Blade 2," and "Blade 3") are present in the cluster. The clients are identified by their IP addresses, i.e., client IP addresses ending in *.*.*.1, *.*.*.2, *.*.*.3, *.*.*.4, ... *.*.*.252, *.*.*.253, etc. An Ethernet switch (such as the iFlow switch employed in the BLADE Network Technologies (BNT) available from International Business Machines Corporation) uses a hash function to make bucket assignments. For instance, the clients with IP address ending in *.*.*.1 are assigned to Bucket #1, those with an IP address ending in *.*.*.2 are assigned to Bucket #2, and so on. It is notable that a hash bucket assignment process is being used as an example in the description merely to illustrate the present techniques. It is to be understood that any load balancing assignment process can be used and the present techniques should not be construed as being limited to any one load balancing assignment process in particular.

The buckets are then assigned to a particular port in a round-robin manner. The ports correspond to the servers. Thus, those clients with a bucket assignment to port 1 are served by server 1, those clients with a bucket assignment to port 2 are served by server 2, and so on. In this case, since there are 3 servers, the bucket assignments proceed sequentially with every $4^{th}$ bucket assignment starting back with port 1 (a round-robin manner). See FIG. 1 where the bucket assignment for client *.*.*.4 is to port 1.

When, for instance, another server is added to the cluster without turning off the appliance, conventional techniques would require creating a new port (e.g., adding a server 4 to the cluster would require creating a new port 4). Using the above round-robin assignment example, the clients assigned to the $4^{th}$ bucket will now be directed to the new port 4. Prior to the addition of the new server 4, the clients assigned to the $4^{th}$ bucket were assigned to port 1/server 1. With regard to these clients, the network connection resets since there is no existing connection. This presents a problem. However, with the present techniques, existing connections (in this example the connections to server 1) will be reassigned from the new server (in this case new server 4) to the previous assignment (in this example server 1) so that the connection is maintained.

Figure 2:
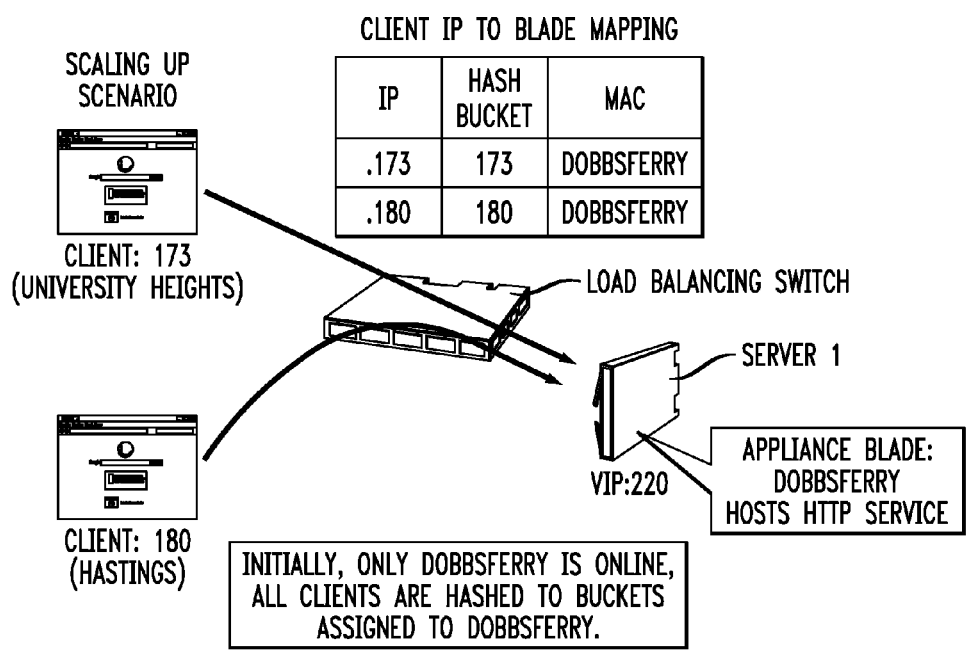
FIG. 2 is a schematic diagram illustrating an initial configuration of a virtual consolidated appliance wherein multiple clients are accessing a single server (server 1) according to an embodiment of the present invention.

Namely, the situation is first examined where a server is added to the cluster, also referred to herein as a scaling up scenario. As shown in FIG. 2, this scenario begins with (for simplicity) two clients, client 173 (in University Heights) and client 180 (in Hastings) accessing a server 1 (in Dobbs Ferry). Initially, only server 1 is online and all clients are hashed to buckets assigned to server 1. As shown in FIG. 2, a load balancing switch maintains a table with the client IP address, the hash bucket assignment and the media access control (MAC) of the server assignment (which in this initial scenario is server 1—Dobbs Ferry).

Figure 3:
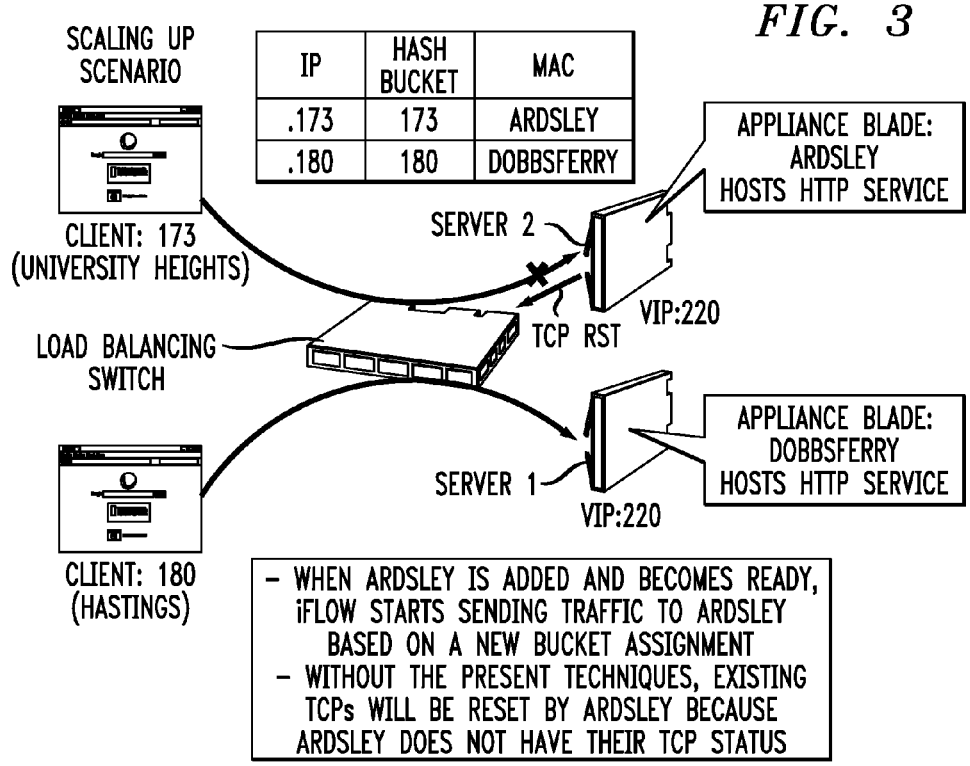
FIG. 3 is a schematic diagram illustrating the addition of a new server (server 2) to the virtual consolidated appliance according to an embodiment of the present invention.

A second server (server 2 (in Ardsley)) is then added to the cluster. See FIG. 3. As described above, this addition of a new server will trigger a bucket reassignment. In the exemplary scenario illustrated in FIG. 3, client 173 gets reassigned to the new server 2 (Ardsley). See the updated load balancing table wherein the client 173 is now hashed to a bucket assigned to server 2. FIG. 3 shows that without the present reassignment techniques, existing connections will be reset (RST) by server 2 because server 2 does not have the connection status.

Figure 4:
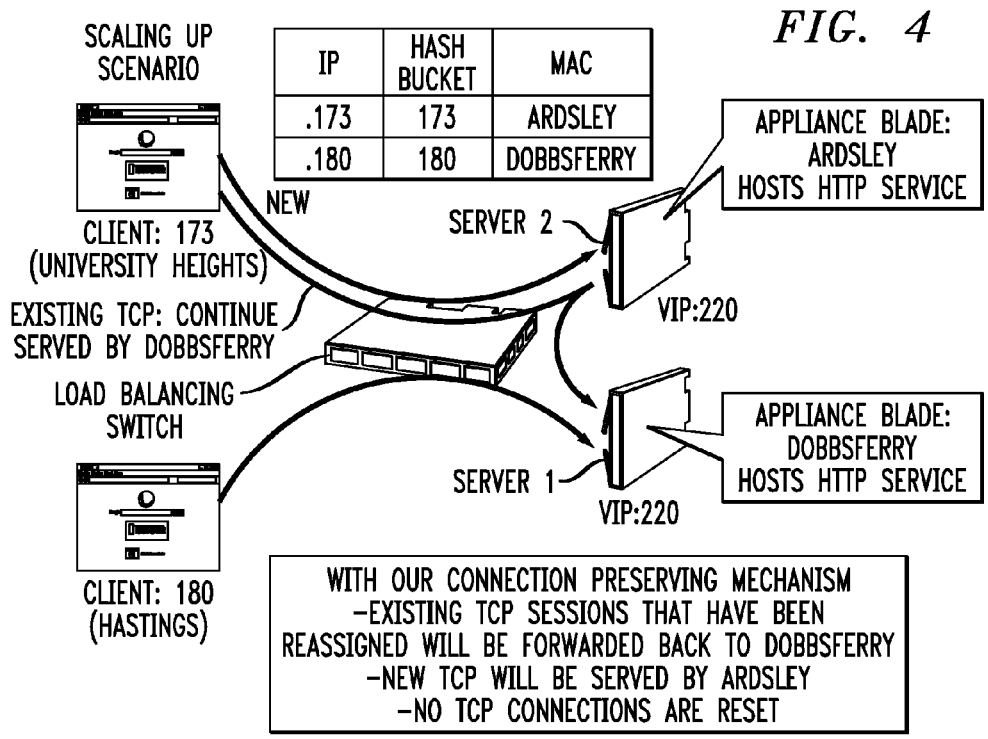
FIG. 4 is a schematic diagram illustrating how existing connections assigned to the new server (server 2) are forwarded back to server 1 such that only new connections assigned to the new server are handled by the new server according to an embodiment of the present invention.

As shown in FIG. 4, however, according to the present techniques, any existing connections reassigned to the new server (server 2) are forwarded back to server 1. Thus in this scenario, server 1 (Dobbs Ferry) will continue to serve these existing connections and will respond to the client 173. As shown in FIG. 4, any new connections (labeled "new") from client 173 will then be handled by the new server (server 2). According to this integration scheme no connections are reset when a new server is added to the cluster.

Figure 5:
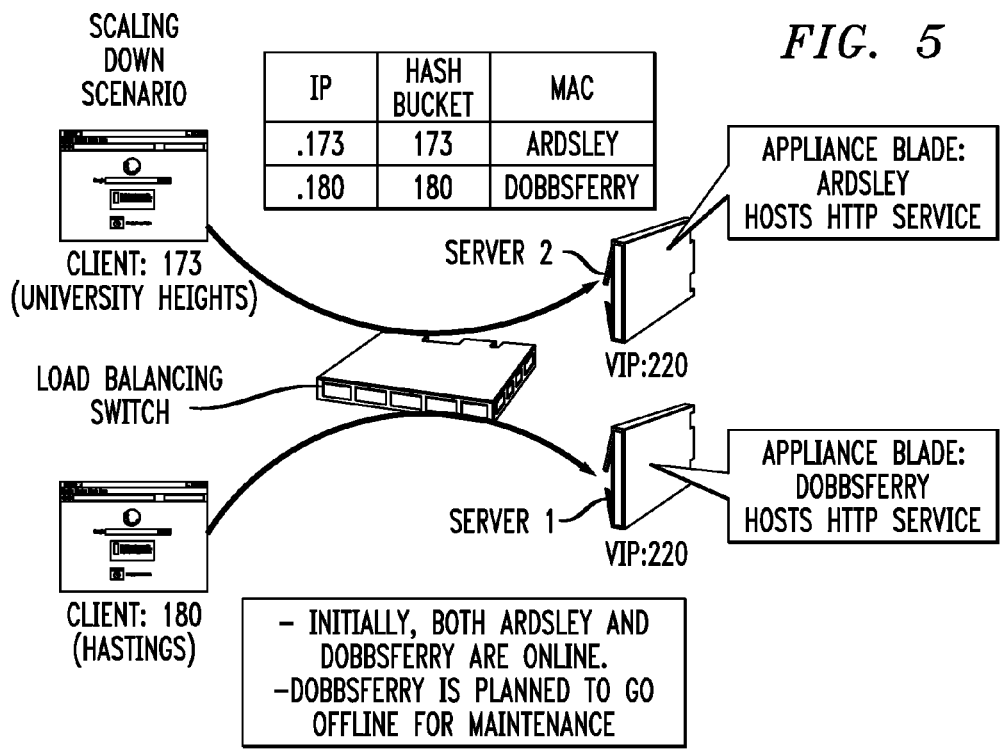
FIG. 5 is a schematic diagram illustrating an initial configuration of a virtual consolidated appliance wherein multiple clients are accessing two servers (server 1 and server 2) according to an embodiment of the present invention.

Next, the situation is examined where a server is removed from the cluster, also referred to herein as a scaling down scenario. A server may be removed from the cluster, for example, for maintenance purposes. As shown in FIG. 5, this exemplary scenario begins with the two clients used above, client 173 (in University Heights) and client 180 (in Hastings) and two servers, server 1 (in Dobbs Ferry) and server 2 (in Ardsley). Client 173 is hashed to a bucket assigned to server 2 and client 180 is hashed to a bucket assigned to server 1. See table shown next to the load balancing switch. In this exemplary scenario, server 1 is planned to go offline for maintenance.

Figure 6:
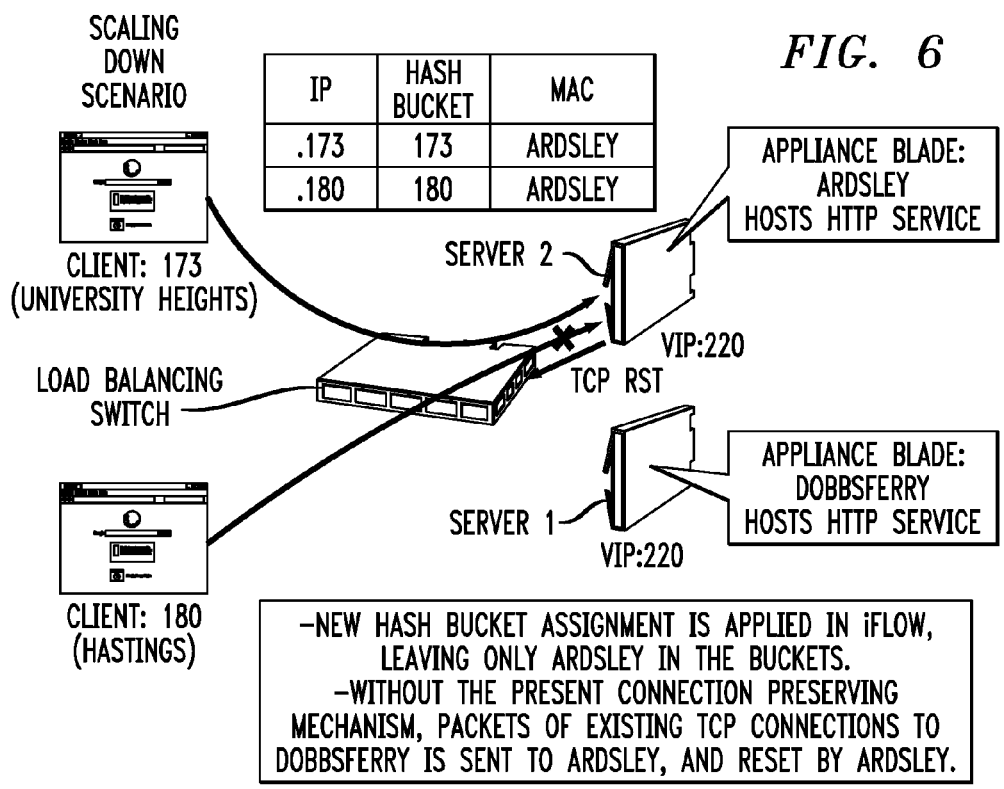
FIG. 6 is a schematic diagram illustrating the application of a new hash bucket assignment where all client connections are routed to server 2 (in anticipation of server 1 going offline) according to an embodiment of the present invention.
Figure 7:
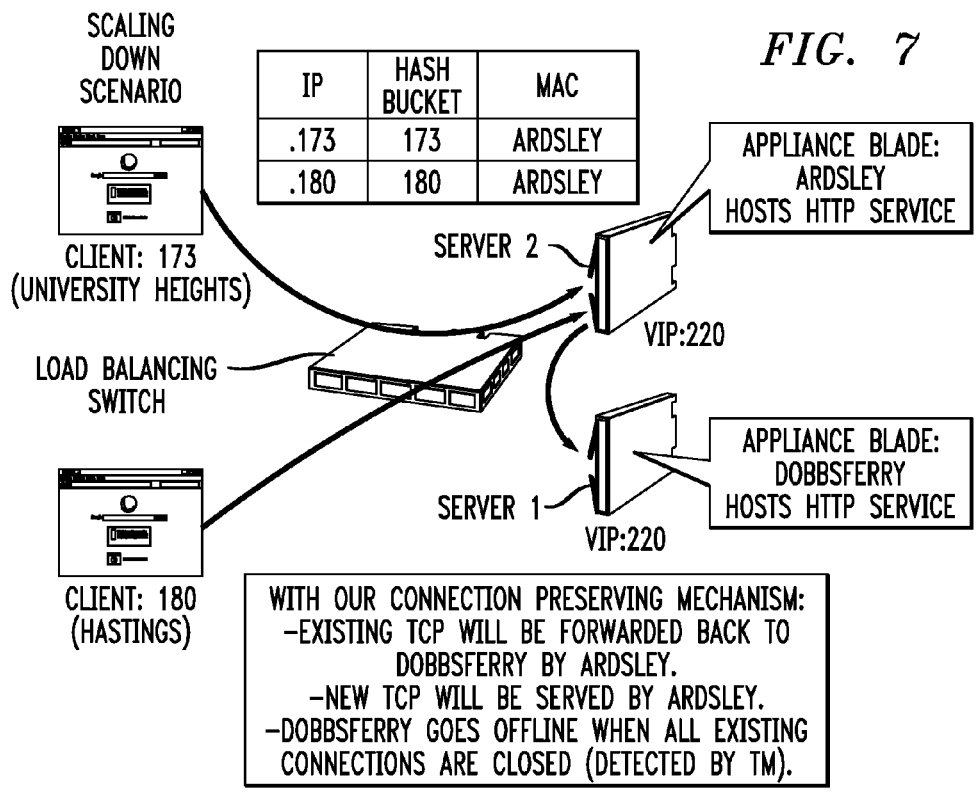
FIG. 7 is a schematic diagram illustrating how existing connections to server 1 are forwarded back to server 1 and that server 1 will go offline only when all existing connections have been closed according to an embodiment of the present invention.

With server 1 offline, a new hash bucket assignment is applied leaving only server 2 in the buckets. See FIG. 6. As shown in FIG. 6, without the present connection-preserving techniques, existing connections to server 1 are lost (TCP RST) when they are sent to server 2, because server 2 does not have the connection status. The present techniques, however, employ a time out period where the administrator first announces that a server (in this case server 1) is going to go offline for maintenance; for power savings, the server will be allocated to another appliance group, etc. Following that announcement, all new connections will be handled by server 2. See FIG. 7, where the updated load balancing table shows that the client 180 is now hashed to a bucket assigned to server 2. However, as shown in FIG. 7, in order to ensure that no connections are reset (RST) when server 1 is removed from the cluster, the existing connections to server 1 will be forwarded back to server 1 by server 2. Server 1 will only go offline when all existing connections are closed (which can be detected by a traffic manager (TM), see description of FIG. 8, below).

In either a scaling up or a scaling down scenario (see above), the present techniques beneficially enable dynamic reconfiguration for any type of virtual consolidated appliance, thus minimizing (or preventing) existing network connection disruptions during reconfiguration, thus providing seamless, uninterrupted performance from the clients' perspective (i.e., as described above, the virtual consolidated appliance appears as one single appliance to the clients (to the outside world)). Further, implementation of the present techniques does not require any changes to existing high speed L2 load balancers (e.g. the L2 load balancers do not need to maintain the flow information).

Figure 8:
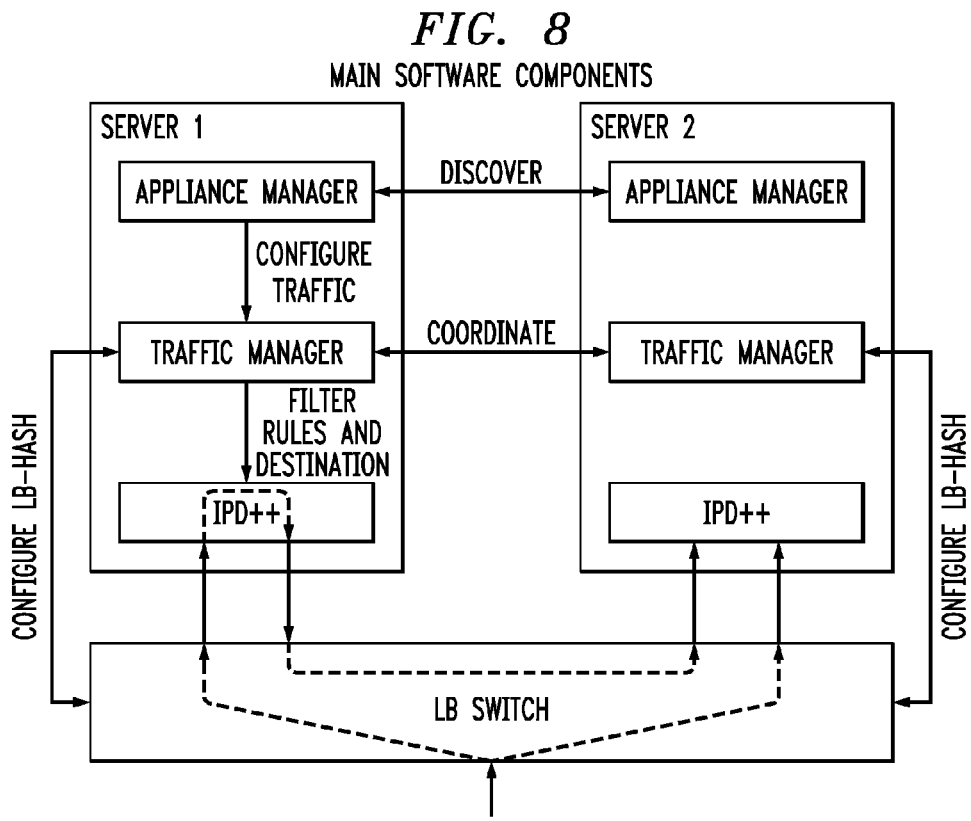
FIG. 8 is a schematic diagram illustrating an exemplary configuration of the present virtual consolidated appliance according to an embodiment of the present invention.

FIG. 8 is a schematic diagram illustrating an exemplary configuration of the present virtual consolidated appliance. As shown in FIG. 8, a cluster of servers (server 1, server 2, . . . , server x) make up the consolidated appliance. An appliance manager (AM), a traffic manager (TM), and an IPD++ is run on each of the servers. When a change is made to the virtual consolidated appliance (e.g., when a server is added or removed—i.e., there is a change in the number of servers) the appliance manager module discovers the change and knows what servers, at any given time, are present in the group. Thus, the appliance manager module serves to announce and discover appliance status and configuration and the addition/removal of a server. Accordingly, reconfiguration of the virtual consolidated appliance is triggered at the appliance manager module. Advantageously, the appliance manager module provides a single control point for reconfiguration, software updates, and patch management of the virtual consolidated appliance. Having a single control point is advantageous for management of the system, since an administrator only needs to log into one module and trigger the update/patch command once, rather than having to log into different blades and triggering the update/patch one by one. As shown in FIG. 8, the appliance manager modules share appliance configuration parameters. Therefore, each of the servers in the group will have commensurate and up to date information regarding the appliance configuration (such as, at any given time, what servers are present in the group).

The traffic manager (TM) module monitors the state in its machine (server) and in other servers in the group. Namely, the traffic manager module monitors TCP session states and, as shown in FIG. 8, shares (coordinates) that information with the other traffic manager modules in the group.

Based on the appliance status, the traffic manager module computes hash bucket assignments for load balancing. See description of hash bucket assignments above. As shown in FIG. 8, the traffic manager module configures the load balancing (LB) switch (see below) with the latest hash bucket assignments. The traffic manager module also configures the IPD++ for L2 forwarding to prevent TCP connection resets during reconfiguration. The methods for forwarding existing connections back to their original servers when a server is added or removed from the cluster/group was described in detail above.

The IPD++ module determines which flow needs to be redirected (L2 forwarding). Namely, the IPD++ module performs L2 forwarding in addition to IPD's L3 filtering and forwarding. The IPD++ module provides application programming interfaces (APIs) for forwarding the traffic between end-hosts and to virtual machines (VMs). APIs permit the application traffic to be forwarded from one blade to another blade efficiently.

As shown in FIG. 8, the virtual consolidated appliance also includes a load balancing (LB) switch. As provided above, the traffic manager modules compute the hash bucket assignments for the load balancing switch based on the appliance status. Accordingly, the load balancing switch in this embodiment uses supervised hash bucket assignment rather than automatic iFlow mode.

FIG. 9 is a diagram illustrating exemplary methodology 900 for operating a virtual consolidated appliance, such as the virtual consolidated appliance shown in FIG. 8 and described above. In step 902, a hash bucket assignment is computed for load balancing based on a status of the virtual consolidated appliance. Using FIG. 2 as an example, the status of the virtual consolidated appliance at this stage in the process would be multiple clients accessing a single server (server 1). With the example shown in FIG. 5 it would be multiple clients accessing multiple servers (server 1 and server 2). These are merely examples shown to illustrate the process. For whatever status (configuration) of the virtual consolidated appliance, the hash bucket assignment is computed. The computation of a hash bucket assignment wherein network connections are assigned to the servers in the virtual consolidated appliance was described in conjunction with the description of FIG. 1, above.

As described, in conjunction with the description of FIG. 8 above, in one exemplary embodiment, this step of computing the hash bucket assignment for load balancing is performed by the traffic manager (TM) module. The traffic manager module is also responsible for configuring the load balancing switch with the current hash bucket assignments (see above).

Next, in step 904, a reconfiguration of the virtual consolidated appliance is discovered. As described above, the reconfiguration of the virtual consolidated appliance can involve the addition of a server(s) to the virtual consolidated appliance (see FIGS. 2-4—scaling up scenario) and/or the removal of a server(s) from the virtual consolidated appliance (see FIGS. 5-7—scaling down scenario).

As described, in conjunction with the description of FIG. 8 above, in one exemplary embodiment, reconfiguration of the virtual consolidated appliance can be discovered by way of the appliance manager module. As provided above, the appliance manager module provides a single control point for reconfiguration of the virtual consolidated appliance.

In step 906, based on the discovery of a reconfiguration of the virtual consolidated appliance (as per step 904), a new hash bucket assignment is computed for load balancing based on the new status (configuration) of the virtual consolidated appliance. As provided above, the new status of the virtual consolidated appliance might be that a server(s) has/have been added to the group and/or that a server(s) has/have been removed from the group.

Again this hash bucket assignment may be performed by the traffic manager module. Step 906 may be performed whenever a change in status of the virtual consolidated appliance is detected, e.g., by the traffic manager module. Further, as provided above, the traffic manager is responsible for configuring the load balancing switch with the new hash bucket assignment. Thus, in step 908, the load balancing switch is configured with the new hash bucket assignment.

By way of the new hash bucket assignment, in step 910 existing network connections are redirected to the previous assigned servers during the reconfiguration in order to avoid connection reset. This concept was described in detail above in the context of a scaling-up scenario (FIGS. 2-4) and in the context of a scaling-down scenario (FIGS. 5-7). As provided above, this redirecting (forwarding) of existing connections may be performed by the IPD++ module.

With the existing network connections being taken care of (so as to avoid connection reset), in step 912 new network connections are served according to the new hash bucket assignment. Again, this concept was described in detail above in the context of a scaling-up scenario (FIGS. 2-4) and in the context of a scaling-down scenario (FIGS. 5-7). As provided above, in the context of the exemplary scaling-down scenario provided, the existing connections are redirected back to the original server (i.e., the server specified in the hash bucket assignment of step 902) and this server will only go offline once the existing connections to it are completed. In that case it is necessary to monitor the existing connections. As described above, this function of monitoring the existing network connections may be performed by the appliance manager module.

FIG. 10 is a diagram illustrating a timeline of the present techniques in the context of a scaling-up scenario, e.g., when a new blade server is being added to the virtual consolidated appliance. In this example, blade servers 1 and 2 exist in the cluster, and a third blade server 3 is being added. Based on the reconfiguration of the appliance (i.e., the addition of the new blade server 3) and the new (updated) hash bucket assignment based on this reconfiguration—see above, the load balancing (LB) switch redirects client 1 and client 2 network connections (labeled client flow 1 and client flow 2, respectively) to the new blade server 3. By way of the present techniques, the existing connections, are however redirected (forwarded) to the previous assigned blade servers (blade servers 1 and 2 for client flows 1 and 2, respectively) so as to avoid connection reset.

Turning now to FIG. 11, a block diagram is shown of an apparatus 1100 for implementing one or more of the methodologies presented herein. By way of example only, apparatus 1100 can be configured to implement one or more of the steps of methodology 900 of FIG. 9 for operating a virtual consolidated appliance having a plurality of servers, such as the virtual consolidated appliance of FIG. 8.

Apparatus 1100 comprises a computer system 1110 and removable media 1150. Computer system 1110 comprises a processor device 1120, a network interface 1125, a memory 1130, a media interface 1135 and an optional display 1140. Network interface 1125 allows computer system 1110 to connect to a network, while media interface 1135 allows computer system 1110 to interact with media, such as a hard drive or removable media 1150.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to compute an assignment for load balancing based on a status of the virtual consolidated appliance; discover a reconfiguration of the virtual consolidated appliance; compute a new assignment for load balancing based on a new status of the virtual consolidated appliance based on the reconfiguration of the virtual consolidated appliance; redirect existing network connections according to the assignment during the reconfiguration of the virtual consolidated appliance; and serve new network connections according to the new assignment.

The machine-readable medium may be a recordable medium (e.g., floppy disks, hard drive, optical disks such as removable media 1150, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1120 can be configured to implement the methods, steps, and functions disclosed herein. The memory 1130 could be distributed or local and the processor device 1120 could be distributed or singular. The memory 1130 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1120. With this definition, information on a network, accessible through network interface 1125, is still within memory 1130 because the processor device 1120 can retrieve the information from the network. It should be noted that each distributed processor that makes up processor device 1120 generally contains its own addressable memory space. It should also be noted that some or all of computer system 1110 can be incorporated into an application-specific or general-use integrated circuit.

Optional display 1140 is any type of display suitable for interacting with a human user of apparatus 1100. Generally, display 1140 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for operating a virtual consolidated appliance having a plurality of servers, the method comprising the steps of:

computing an assignment for load balancing based on a status of the virtual consolidated appliance, wherein the virtual consolidated appliance comprises the plurality of servers operating as a cluster of physical machines that appears to users as a single server;

discovering a reconfiguration of the virtual consolidated appliance, wherein the reconfiguration of the virtual consolidated appliance comprises a change in a number of the servers whereby an existing server is removed from the cluster or a new server is added to the cluster;

computing a new assignment for load balancing based on a new status of the virtual consolidated appliance based on the reconfiguration of the virtual consolidated appliance;

during the reconfiguration of the virtual consolidated appliance, redirecting existing network connections according to the assignment computed prior to the reconfiguration of the virtual consolidated appliance by forwarding any of the existing network connections which have been reassigned back to a server assigned prior to the reconfiguration, while serving new network connections according to the new assignment, such that the existing network connections are maintained during the reconfiguration of the virtual consolidated appliance and no connections are reset.

2. The method of claim 1, wherein the reconfiguration of the virtual consolidated appliance comprises an addition of at least one server to the virtual consolidated appliance.

3. The method of claim 1, wherein the reconfiguration of the virtual consolidated appliance comprises a removal of at least one of the servers from the virtual consolidated appliance.

4. The method of claim 1, wherein the virtual consolidated appliance comprises a load balancing switch for directing network connections to the servers.

5. The method of claim 4, wherein the load balancing switch maintains a table with the assignment.

6. The method of claim 5, further comprising the step of:
updating the table with the new assignment.

7. The method of claim 4, further comprising the step of:
configuring the load balancing switch with the assignment.

8. The method of claim 4, further comprising the step of:
configuring the load balancing switch with the new assignment.

9. The method of claim 4, wherein the serving step is performed using the load balancing switch.

10. The method of claim 3, further comprising the step of:
redirecting the existing network connections according to the assignment during the reconfiguration of the virtual consolidated appliance until all of the existing network connections have been completed.

11. The method of claim 10, further comprising the step of:
monitoring the existing network connections.

12. The method of claim 1, wherein the assignment is computed using a hash function.

* * * * *